United States Patent
Mohamed et al.

(10) Patent No.: US 11,003,283 B2
(45) Date of Patent: May 11, 2021

(54) TOUCH SENSING APPARATUS AND TOUCH SENSING SYSTEM

(71) Applicant: SILICON WORKS CO., LTD., Daejeon (KR)

(72) Inventors: Mohamed Gamal Ahmed Mohamed, Daejeon (KR); Mun Seok Kang, Daejeon (KR); Hee Jin Lee, Daejeon (KR); Jun Seop Lee, Daejeon (KR); Kyung Min Shin, Daejeon (KR)

(73) Assignee: SILICON WORKS CO., LTD., Daejeon (KR)

(*) Notice: Subject to any disclaimer, the term of this patent is extended or adjusted under 35 U.S.C. 154(b) by 0 days.

(21) Appl. No.: 16/717,642

(22) Filed: Dec. 17, 2019

(65) Prior Publication Data

US 2020/0210045 A1 Jul. 2, 2020

(30) Foreign Application Priority Data

Dec. 26, 2018 (KR) .................. 10-2018-0169554

(51) Int. Cl.
*G06F 3/041* (2006.01)
*G06F 3/044* (2006.01)

(52) U.S. Cl.
CPC ........ *G06F 3/04182* (2019.05); *G06F 3/0446* (2019.05); *G06F 3/04164* (2019.05)

(58) Field of Classification Search
CPC ...... G06F 3/0446; G06F 3/0412; G06F 3/044; G06F 3/0445; G06F 3/041
See application file for complete search history.

(56) References Cited

U.S. PATENT DOCUMENTS

| | | | |
|---|---|---|---|
| 9,619,083 B1* | 4/2017 | Kang | G09G 5/006 |
| 2008/0157867 A1* | 7/2008 | Krah | G06F 3/0445 |
| | | | 329/304 |
| 2008/0158181 A1* | 7/2008 | Hamblin | G06F 3/04164 |
| | | | 345/173 |
| 2008/0165158 A1* | 7/2008 | Hotelling | G02F 1/133345 |
| | | | 345/174 |
| 2009/0303193 A1* | 12/2009 | Lim | G06F 3/04166 |
| | | | 345/173 |
| 2010/0103121 A1* | 4/2010 | Kim | G06F 3/0446 |
| | | | 345/173 |
| 2010/0188347 A1* | 7/2010 | Mizuhashi | G06F 3/0412 |
| | | | 345/173 |
| 2011/0187677 A1* | 8/2011 | Hotelling | G06F 3/04184 |
| | | | 345/174 |
| 2011/0254802 A1* | 10/2011 | Philipp | G06F 3/044 |
| | | | 345/174 |
| 2012/0293430 A1* | 11/2012 | Kitada | G06F 3/044 |
| | | | 345/173 |
| 2013/0093722 A1* | 4/2013 | Noguchi | G06F 3/0416 |
| | | | 345/174 |

(Continued)

FOREIGN PATENT DOCUMENTS

| | | |
|---|---|---|
| JP | 5885237 B2 | 2/2016 |
| KR | 10-1447542 B1 | 9/2014 |
| KR | 10-1778731 B1 | 9/2017 |

*Primary Examiner* — Olga V Merkoulova
(74) *Attorney, Agent, or Firm* — Fenwick & West LLP

(57) ABSTRACT

An embodiment provides a touch sensing device configured to divide one driving cycle into two parts and to summate or subtract touch sensing data regarding respective parts, thereby removing periodic noise.

19 Claims, 10 Drawing Sheets

(56) References Cited

U.S. PATENT DOCUMENTS

| | | | |
|---|---|---|---|
| 2015/0110500 A1* | 4/2015 | Noguchi | G02F 1/225 398/142 |
| 2015/0277665 A1* | 10/2015 | Chang | G01R 27/2605 345/174 |
| 2016/0026335 A1* | 1/2016 | Ahn | G06F 3/044 345/173 |
| 2017/0285745 A1* | 10/2017 | Doran | G06F 3/0416 |
| 2018/0129302 A1* | 5/2018 | Westhues | G06F 3/038 |

* cited by examiner

TOUCH SENSING APPARATUS AND TOUCH SENSING SYSTEM

CROSS REFERENCE TO RELATED APPLICATION

This application claims priority from Korean Patent Application No. 10-2018-0169554, filed on Dec. 26, 2018, which is hereby incorporated by reference for all purposes as if fully set forth herein.

BACKGROUND OF THE INVENTION

1. Field of the Invention

The present embodiment relates to touch sensing and, more specifically, to a touch sensing technology for minimizing the influence of noise.

2. Description of the Prior Art

A technology for recognizing an external object that approaches a touch panel or touches the touch panel is referred to as a touch sensing technology.

The touch panel is placed in the same position with a display panel on a plane such that users can input a user manipulation signal to the touch panel while watching images on the display panel.

Such a method for generating a user manipulation signal provides a high level of user intuitiveness compared with previous other user manipulation signal input schemes, such as a mouse input scheme or a keyboard input scheme.

The touch sensing technology, due to the above-mentioned advantage, has been applied to various electronic devices including a display panel.

A touch sensing device supplies a driving signal to a driving electrode disposed on the touch panel and receives a reaction signal formed on a sensing electrode such that the same can sense the touch or approach of an external object with regard to the touch panel.

Meanwhile, the touch panel may be influenced by noise. Such noise may distort the driving signal or the reaction signal, and may cause errors related to touch sensing.

Noise affecting the touch panel mainly occurs in the display panel. The display panel is positioned close to the touch panel and thus may be coupled to electrodes (driving electrodes and sensing electrodes) disposed on the touch panel by a capacitance. In addition, signals occurring in the display panel are delivered to the touch panel through the capacitance, thereby forming noise in the touch panel.

In order to sense a touch while avoiding noise occurring in the display panel, the display time and the touch time are divided during driving (time-division scheme). However, the time-division scheme has a problem in that the data driving device for driving the display panel and the touch sensing device for driving the touch panel need to be synchronized. The time-division scheme has another problem in that the accuracy of touch sensing is difficult to improve because the touch panel needs to be sensed for a short time (mainly blank time) during which the display panel is not driven within a frame.

SUMMARY OF THE INVENTION

In this background, an aspect of the present embodiment is to provide a touch sensing technology that minimizes the influence of noise.

In accordance with an aspect, there is provided a touch sensing device configured to drive a touch panel influenced by periodic noise, the touch sensing device including: a driving unit configured to supply a first part driving signal to a driving electrode of the touch panel during a first part time, to supply a second part driving signal to the driving electrode of the touch panel during a second part time, and to supply no driving signal for a gap time; a sensing unit configured to receive a first part reaction signal to the first part driving signal from a sensing electrode of the touch panel, to generate first part sensing data using the first part reaction signal, to receive a second part reaction signal to the second part driving signal from the sensing electrode, to generate second part sensing data using the second part reaction signal, and to generate sensing data for the touch panel by processing the first part sensing data and the second part sensing data; and a control unit configured to control the driving unit and the sensing unit.

In connection with the touch sensing device, the control unit may control the driving unit such that the first part driving signal and the second part driving signal have substantially the same waveform when a first half cycle and a second half cycle of the noise respectively have opposite waveforms.

In connection with the touch sensing device, the control unit may control the driving unit such that the first part driving signal and the second part driving signal have a phase difference of 180° between them when a first half cycle and a second half cycle of the noise include noise with substantially the same waveform.

In connection with the touch sensing device, the first part time and the second part time may have substantially the same length.

In connection with the touch sensing device, the driving unit may simultaneously drive multiple driving electrodes by using a phase modulation scheme.

In connection with the touch sensing device, the noise and the driving signal may have a phase difference between them.

In connection with the touch sensing device, the driving unit may supply no driving signal for a gap time, and the control unit may adjust the length of the gap time such that a driving cycle substantially coincides with the noise occurrence cycle.

The touch sensing device may further include a storage unit having a gap time register configured to store the length of the gap time, and the control unit may adjust the length of the gap time according to a value stored in the gap time register.

In connection with the touch sensing device, the storage unit may further include a phase register configured to store the phase difference between the first part driving signal and the second part driving signal, and the control unit may determine the phase difference between the first part driving signal and the second part driving signal according to a value stored in the phase register.

In connection with the touch sensing device, the gap time may be divided into a first half gap time and a second half gap time, the first half gap time may be arranged after the first part time, and the second half gap time may be arranged after the second part time.

In accordance with another aspect, there is provided s touch sensing system including: a touch panel on which multiple driving electrodes are disposed and multiple sensing electrodes, respectively coupled to the driving electrodes by a capacitance, are disposed and adjacent to which a display panel is disposed close to the touch panel; and a touch driving device configured to supply a first part driving signal to the driving electrodes during a first part time, to supply a second part driving signal to the driving electrodes during a second part time, to receive a first part reaction signal to the first part driving signal from the sensing electrodes, to generate first part sensing data using the first part reaction signal, to receive a second part reaction signal to the second part driving signal from the sensing electrodes, to generate second part sensing data using the second part reaction signal, and to generate sensing data for the touch panel by processing the first part sensing data and the second part sensing data.

In connection with the touch sensing system, the driving cycle of the display panel and the driving cycle of the touch panel may be unsynchronized.

In connection with the touch sensing system, some electrodes disposed on the display panel and the driving electrodes or the sensing electrodes may be coupled by a capacitance.

In connection with the touch sensing system, the touch driving device may adjust the length of a gap time during which no driving signal is supplied such that the driving cycle of the touch panel substantially coincides with the noise occurrence cycle of the display panel.

In connection with the touch sensing system, the first part time and the second part time may be fixed, and the gap time may be variable.

In connection with the touch sensing system, the touch driving device may control the first part driving signal and the second part driving signal so as to have a phase difference of 180° between them when a first half cycle and a second half cycle of noise from the display panel include noise with opposite waveforms.

In connection with the touch sensing system, the touch driving device may control the first part driving signal and the second part driving signal so as to have substantially the same waveform when a first half cycle and a second half cycle of noise from the display panel include noise with substantially the same waveform.

In accordance with another aspect, there may be provided a method for driving a touch panel influenced by periodic noise, the method including: supplying a first part driving signal to a driving electrode of the touch panel during a first part time, receiving a first part reaction signal to the first part driving signal from a sensing electrode of the touch panel, and generating first part sensing data using the first part reaction signal; supplying a second part driving signal to the driving electrode of the touch panel during a second part time, receiving a second part reaction signal to the second part driving signal from the sensing electrode, and generating second part sensing data using the second part reaction signal; and generating sensing data for the touch panel by processing the first part sensing data and the second part sensing data.

The method may further include adjusting a gap time during which no driving signal is supplied such that a driving cycle regarding the touch panel substantially coincides with the noise occurrence cycle.

As described above, according to the present embodiment, the influence of noise can be minimized in connection with touch sensing.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
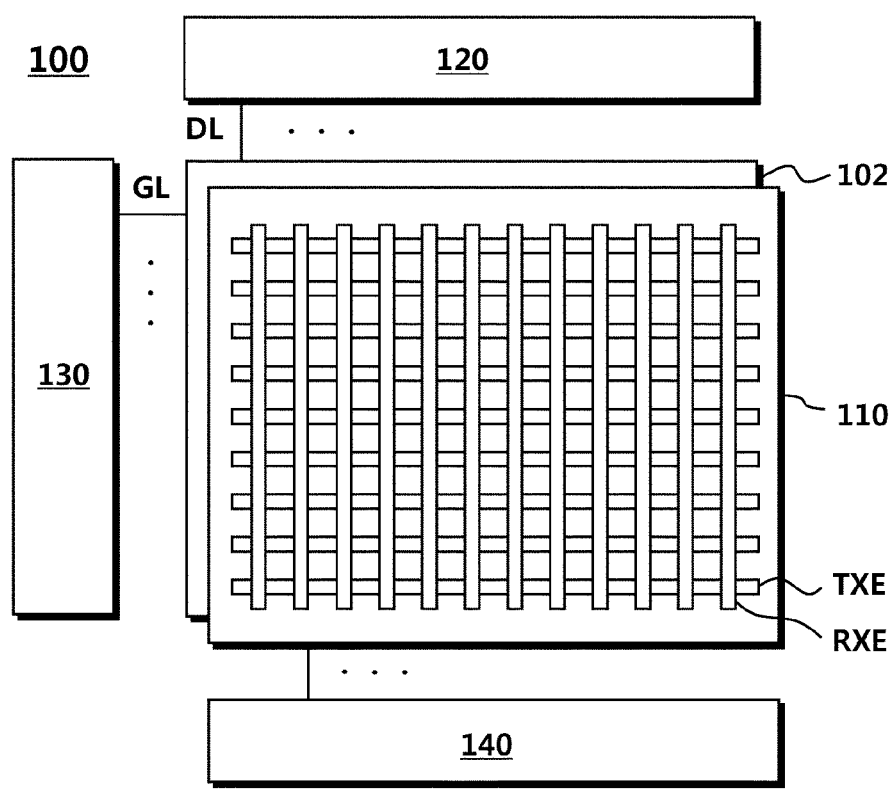
FIG. 1 is a diagram illustrating the configuration of a display device according to an embodiment.

FIG. 1 is a diagram illustrating the configuration of a display device according to an embodiment.

Referring to FIG. 1, the display device 100 may include a display panel 102, a touch panel 110, a data driving device 120, a gate driving device 130, a touch sensing device 140, and the like.

The display panel 102 may have multiple data lines DL formed thereon and connected to the data driving device 120, and may have multiple gate lines GL formed thereon and connected to the gate driving device 130. In addition, the display panel 102 may have multiple pixels defined so as to correspond to points of intersection between the multiple data lines DL and the multiple gate lines GL.

Each pixel may have a transistor formed thereon so as to have a first electrode (for example, source electrode or drain electrode) connected to a data line DL, to have a gate electrode connected to a gate line GL, and to have a second electrode (for example, drain electrode or source electrode) connected to a display electrode.

The touch panel 110 may be positioned on one side (upper side or lower side) of the display panel 102, and the touch panel 110 may have multiple driving electrodes TXE and multiple sensing electrodes RXE disposed thereon.

The display panel 102 and the touch panel 110 may be positioned separately from each other. For example, the panels may be fabricated by forming the touch panel 110 through a separate process and then attaching the same to the display panel 102. Panels known as add-on types are an example of such panels.

The data driving device 120 supplies a data signal to the data lines DL such that respective pixels of the display panel 102 display a digital image.

The data driving device 120 may include at least one data driver integrated circuit. The at least one data driver integrated circuit may be connected to a bonding pad of the display panel 102 in a tape automated bonding (TAB) type or in a chip-on-glass (COG) type, or may be directly formed on the display panel 102. If necessary, the at least one data driver integrated circuit may be integrated with and formed on the display panel 102. In addition, the data driving device 120 may be implemented on a chip-on-film (COF) type.

The gate driving device 130 successively supplies a scan signal to the gate lines GL in order to turn on or off transistors positioned at respective pixels.

According to the driving type, the gate driving device 130 may be positioned on one side of the display panel 102 as illustrated in FIG. 1, or two gate driving devices 130 may be positioned on both sides of the display panel 102, respectively.

The gate driving device 130 may include at least one gate driver integrated circuit. The at least one gate driver integrated circuit may be connected to the bonding pad of the display panel 102 in a tape automated bonding (TAB) type or in a chip-on-glass (COG) type, or may be implemented in a gate-in-panel (GIP) type and directly formed on the display panel 102. If necessary, the at least one gate driver integrated circuit may be integrated with and formed on the display panel 102. In addition, the gate driving device 130 may be implemented in a chip-on-film (COF) type.

The touch sensing device 140 may supply a driving signal to the driving electrodes TXE and may receive a reaction signal regarding the driving signal from the sensing electrodes RXE. In addition, the touch sensing device 140 may sense a touch or an approach of an external object with regard to the touch panel 110 according to the reaction signal.

Although the display device 100 is illustrated in FIG. 1 as having one touch sensing device 140 positioned thereon, the display device 100 may include two or more touch sensing devices 140.

Meanwhile, the display device 100 may recognize an approach or touch of an object by sensing a change in the capacitance through the sensing electrodes RXE (capacitive touch scheme).

The capacitive touch scheme may be classified, for example, into a mutual capacitance touch scheme and a self-capacitance touch scheme.

According to the mutual capacitance touch scheme, which is a kind of capacitive touch scheme, a driving signal is supplied to the driving electrodes TXE, and a reaction signal is received from the sensing electrodes RXE coupled to the driving electrodes TXE by a capacitance, thereby sensing a touch or an approach with regard to the touch panel 110. The mutual capacitance touch scheme detects a touch/no touch, a touch coordinate, and the like by using a sensing value from the sensing electrodes RXE, which varies depending on the approach or touch of an object such as a finger or a pen.

According to the self-capacitance touch scheme, which is another kind of capacitive touch scheme, a driving signal is supplied to driving electrodes TXE, and the corresponding driving electrodes TXE are again sensed. In the self-capacitance touch scheme, there is no distinction between driving electrodes TXE and sensing electrodes RXE. The self-capacitance touch scheme detects a touch/no touch, a touch coordinate, and the like by using a sensing value from the corresponding driving electrodes TXE, which varies depending on the approach or touch of an object such as a finger or a pen.

The display device 100 may employ one of the two above-mentioned capacitive touch schemes (mutual capacitance touch scheme and self-capacitance touch scheme). It will be assumed in the following description of embodiments that the mutual capacitance touch scheme is employed, for convenience of description.

Figure 2:
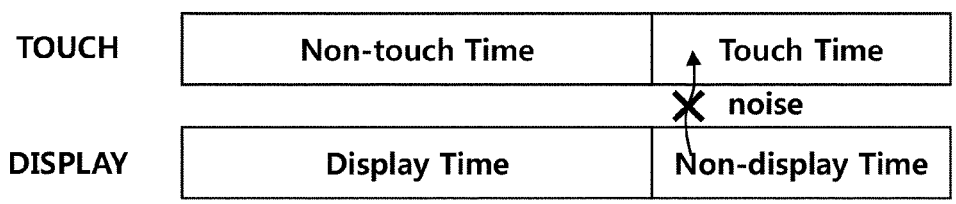
FIG. 2 is a diagram illustrating the influence of noise from a display panel on a touch panel according to respective cases.
Figure 2:
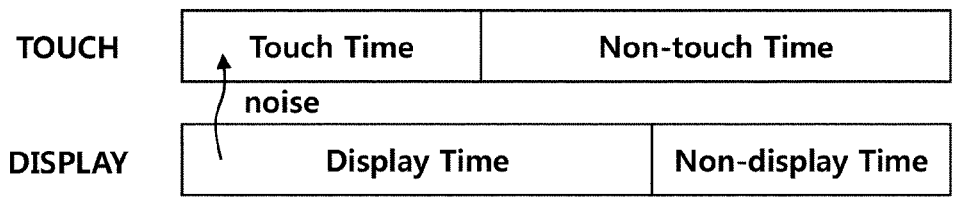
Figure 2:
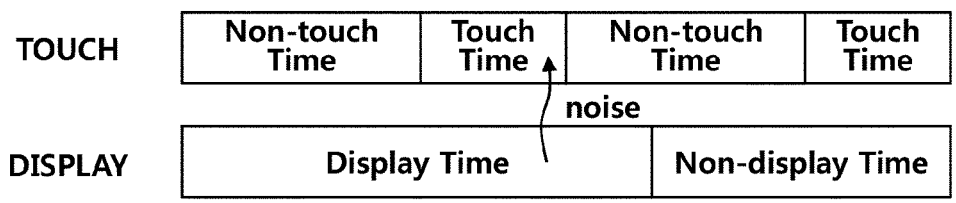

FIG. 2 is a diagram illustrating the influence of noise from a display panel on a touch panel according to respective cases.

Touch sensing may be synchronized with display driving or unsynchronized therewith.

CASE-A in FIG. 2 corresponds to a case in which touch sensing and display driving are synchronized with each other. The display device may distinguish between a display time and a touch time and may sense the touch panel while the display panel is not driven. This scheme can minimize the influence of display noise in connection with touch sensing. However, this scheme has a problem in that the touch sensing and the display driving need to be synchronized.

CASE-B in FIG. 2 corresponds to a case in which touch sensing and display driving are unsynchronized. The display device may perform driving regarding the display panel and sensing regarding the touch panel independently of each other. This scheme has a problem in that the touch sensing and the display driving may overlap, and the resulting display noise may influence the touch panel.

CASE-C in FIG. 2 corresponds to a case in which the driving cycle of the touch panel and the driving cycle of the display panel do not coincide. This scheme has a problem in that the touch sensing and the display driving may overlap, and the resulting display noise may influence the touch panel.

A touch sensing device, a touch sensing system, and a display device according to an embodiment can minimize the influence of display noise on touch sensing even if touch sensing and display driving overlap.

Display noise has a periodicity. The touch sensing device, touch sensing system, and display device according to an embodiment may generate sensing data regarding the touch panel by processing first part sensing data generated by sensing the touch panel for the first half cycle of the display noise and second part sensing data generated by sensing the touch panel for the second half cycle thereof. Noise with the same waveform may be inserted into the first part sensing data and the second part sensing data, or noise with opposite waveforms may be inserted therein. However, the touch sensing device, touch sensing system, and display device according to an embodiment may remove noise with the same waveform or noise with opposite waveforms by performing an operation of adding or subtracting the first part sensing data and the second part sensing data.

Hereinafter, major technologies capable of implementing the touch sensing device, touch sensing system, and display device will be described.

Figure 3:
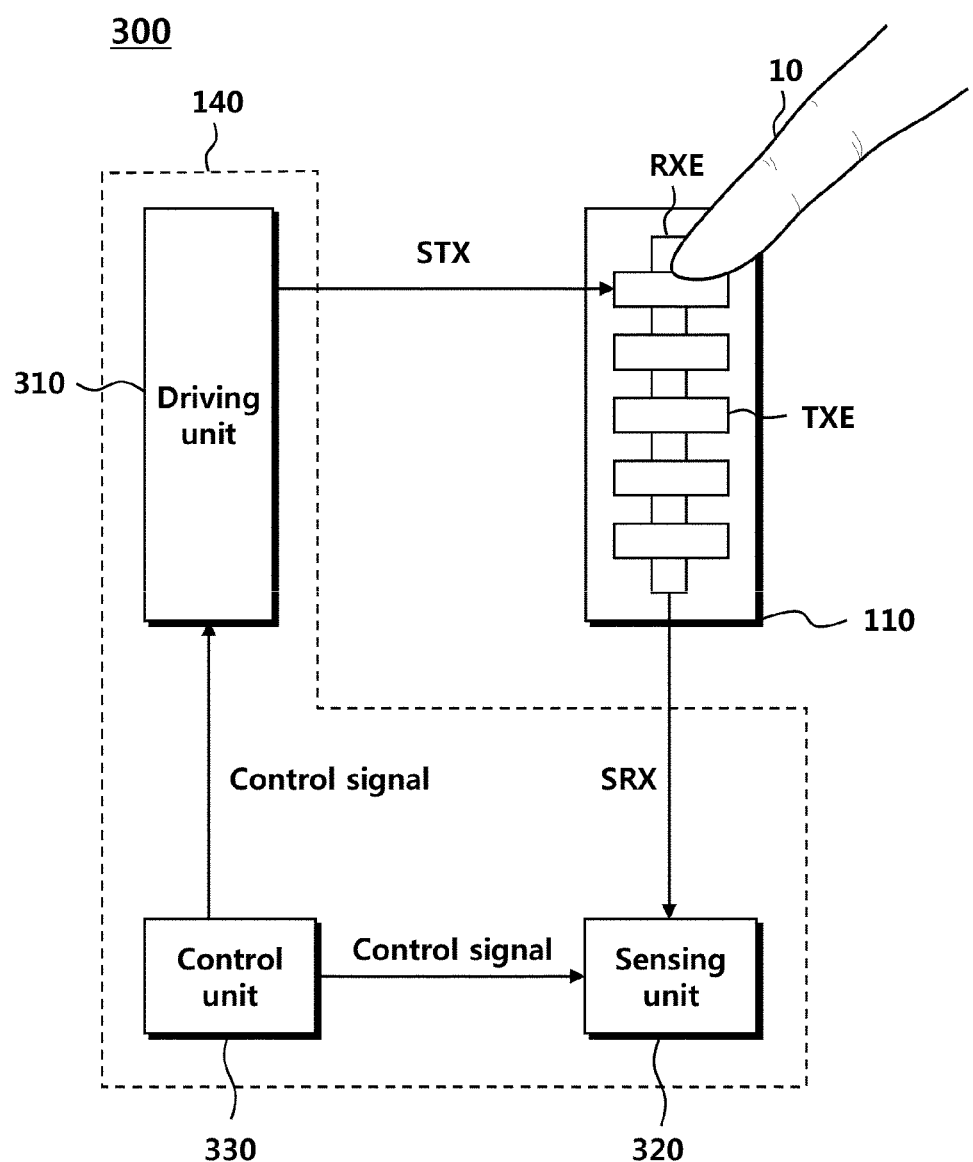
FIG. 3 is a diagram schematically illustrating a touch sensing system according to an embodiment.

FIG. 3 is a diagram schematically illustrating a touch sensing system according to an embodiment.

Referring to FIG. 3, the touch sensing system 300 may include a touch panel 110 and a touch sensing device 140.

The touch panel 110 may have multiple driving electrodes TXE disposed thereon and may have a sensing electrode RXE disposed thereon and coupled to the driving electrodes TXE.

The touch sensing device 140 may include a driving unit 310 and a sensing unit 320, and may further include a control unit 330 for controlling the driving unit 310 and the sensing unit 320.

The driving unit 310 may supply a driving signal STX to the driving electrodes TXE. The driving signal STX may include a first part driving signal supplied during a first part time in one driving cycle, and a second part driving signal supplied during a second part time.

The sensing unit 320 may receive a reaction signal SRX regarding the driving signal STX from the sensing electrode RXE, and may sense a touch or an approach of an object 10 with regard to the touch panel 110 according to the reaction signal SRX. The sensing unit 320 may receive a first part reaction signal regarding the first part driving signal from the sensing electrode RXE, and may generate first part sensing data according to the first part reaction signal. In addition, the sensing unit 320 may receive a second part reaction signal regarding the second part driving signal from the sensing electrode RXE, and may generate second part sensing data according to the second part reaction signal. In addition, the sensing unit 320 may conduct an operation (for example, averaging operation or adding/subtracting operation) with regard to the first part sensing data and the second part sensing data so as to generate sensing data regarding each reaction signal SRX.

The sensing data may include a sensing value generated by demodulation of the reaction signal SRX. For example, the sensing value may be a time integration value of the current or voltage of the reaction signal SRX. The sensing value may be used to determine whether or not an object 10 touches the touch panel 110 or to generate a touch coordinate. For example, if the magnitude of the sensing value is larger than or equal to a reference value, it may be determined that the object 10 made a touch.

The sensing unit 320 may apply a demodulation signal to the reaction signal SRX so as to demodulate the reaction signal SRX. The sensing unit 320 may demodulate the reaction signal SRX by processing the demodulation signal and the reaction signal SRX, phases of which are synchronized with each other, such that they are multiplied in signal terms. The first part driving signal and the second part driving signal may have different phases, and the sensing unit 320 may apply demodulation signals with different phases to the first part reaction signal and the second part reaction signal, respectively, so as to demodulate the same.

The driving unit 310 may generate multiple part driving signals having different phases. The driving unit 310 may simultaneously supply such multiple part driving signals to multiple driving electrodes, and the sensing unit 320 may demodulate the part reaction signals by using demodulation signals having different phases, thereby implementing multi-driving. Multiple part driving signals used for multi-driving may be selectively applied to the first part driving signal and the second part driving signal. In other words, the touch sensing device 140 may implement multi-driving by using multiple part driving signals having different phases, or may implement a first part driving signal and a second part driving signal having different phases.

Figure 4:
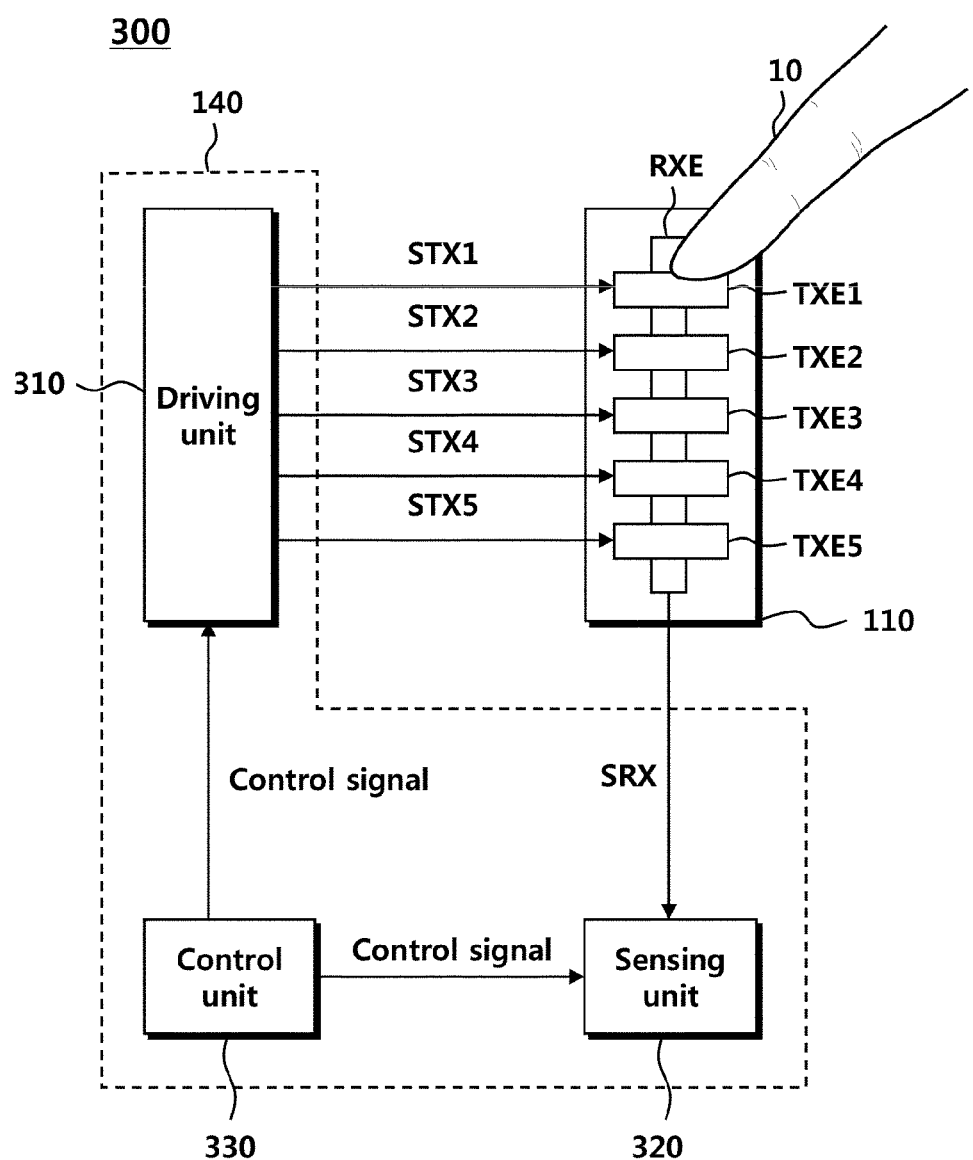
FIG. 4 is a diagram illustrating multi-driving conducted by a touch sensing system according to an embodiment.

FIG. 4 is a diagram illustrating multi-driving conducted by a touch sensing system according to an embodiment.

Referring to FIG. 4, the driving unit 310 may simultaneously supply multiple driving signals STX1-STX5 having different phases to multiple driving electrodes TXE1-TXE5.

The sensing unit 320 may receive a reaction signal SRX regarding the multiple driving signals STX1-STX5 from the sensing electrode RXE and may apply different demodulation signals to the reaction signal SRX such that the sensing unit 320 can simultaneously sense a touch or an approach of an object 10 with regard to points of intersection between the sensing electrode RXE and the multiple driving electrodes TXE1-TXE5.

Figure 5:
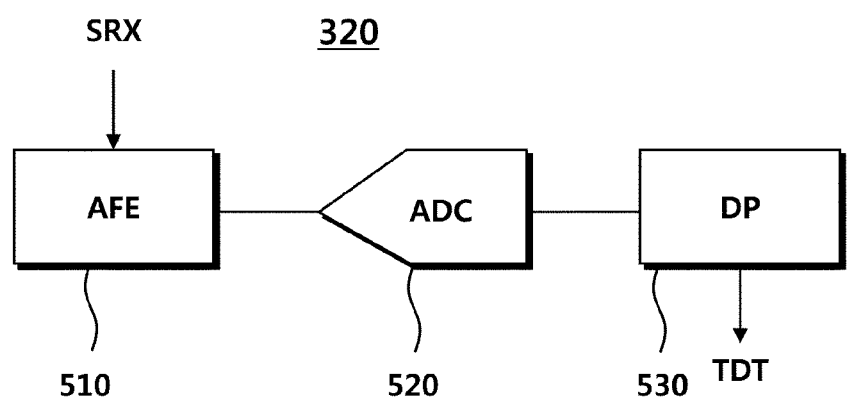
FIG. 5 is a diagram illustrating the configuration of a sensing unit according to an embodiment.

FIG. 5 is a diagram illustrating the configuration of a sensing unit according to an embodiment.

Referring to FIG. 5, the sensing unit 320 may include an analog front-end unit 510, an analog-digital conversion unit 520, a digital processing unit 530, and the like.

The analog front-end unit 510 may include an amplifier, a circuit for correlated double sampling (CDS) and the like. The analog front-end unit 510 may further include a circuit for demodulating a reaction signal by using a demodulation signal.

The analog-digital conversion unit 520 may convert the output from the analog front-end unit 510 so as to generate sensing raw data.

The digital processing unit 530 may process the sensing raw data so as to generate sensing data. When the analog-digital conversion unit 520 generates first part sensing raw data corresponding to a first part reaction signal and generates second part sensing raw data corresponding to a second part reaction signal, the digital processing unit 530 may process the first part sensing raw data so as to generate first part sensing data and may process the second part sensing raw data so as to generate second part sensing data. The digital processing unit 530 may conduct an operation with regard to the first part sensing data and the second part sensing data, thereby generating sensing data.

Figure 6:
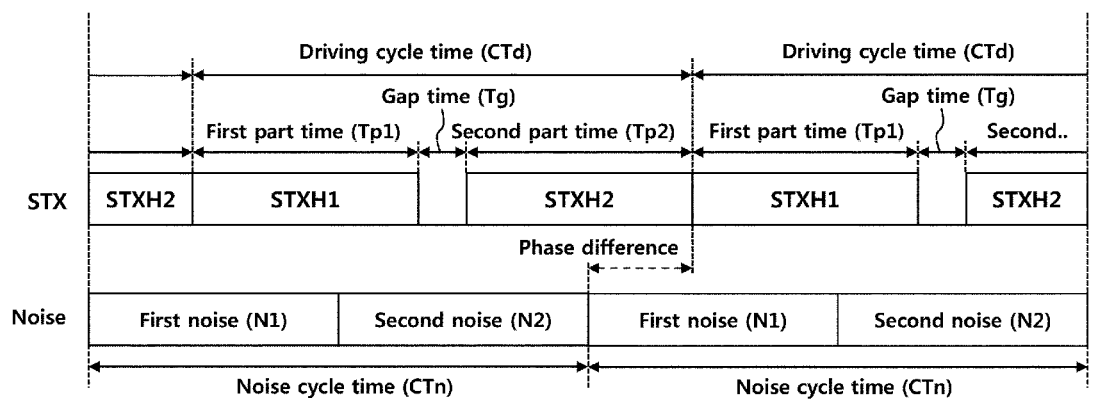
FIG. 6 is a diagram illustrating a first exemplary configuration of a driving signal in a touch sensing device according to an embodiment.

FIG. 6 is a diagram illustrating a first exemplary configuration of a driving signal in a touch sensing device according to an embodiment.

Referring to FIG. 6, the driving cycle time CTd of the driving signal may include a first part time Tp1, a gap time Tg, and a second part time Tp2.

The driving unit may supply a first part driving signal STXH1 to a driving electrode of the touch panel for the first part time Tp1. In addition, the driving unit may supply a second part driving signal STXH2 to the driving electrode of the touch panel for the second part time Tp2. No driving signal is supplied for the gap time Tg, during which the driving unit may supply a driving low voltage to the driving electrode, may ground the driving electrode, or may float the driving electrode.

Noise affecting the touch panel may have a periodicity, and noise in one cycle may be divided into first noise N1 and second noise N2. The first noise N1 and the second noise N2 may include noise with the same waveform or noise with opposite waveforms.

The driving cycle time CTd of the driving signal and the noise cycle time CTn may be substantially identical. Accordingly, the first noise N1 and the second noise N2, which constitute the noise, may influence the first part driving signal STXH1 and the second part driving signal STXH2 in the same time range of each cycle.

The noise is likely to be display noise or power supply noise resulting from supply of power to the display device, and the noise cycle time CTn in this regard may be identical to the horizontal cycle time (1-H) or frame time (1 frame). When the driving cycle time CTd is identical to the noise cycle time CTn, the driving cycle time CTd may be identical to the horizontal cycle time (1-H) or frame time (1 frame).

Since the first part driving signal SUCH' and the second part driving signal STXH2 are influenced by noise with the same waveform or noise with opposite waveforms for each cycle, the touch sensing device may conduct an operation (for example, averaging operation or adding/subtracting operation) with regard to the first part sensing data regarding the first part driving signal STXH1 and the second part sensing data regarding the second part driving signal STXH2 so as to remove the influence of noise on the touch panel.

The touch sensing device may adjust the gap time Tg such that the driving cycle of the driving signal and the noise occurrence cycle coincide. The first part time Tp1 and the second part time Tp2 may be substantially fixed. Under this condition, the touch sensing device may adjust the gap time Tg such that the driving cycle of the driving signal and the noise occurrence cycle coincide.

The driving cycle of the display panel and the driving cycle of the touch panel may be unsynchronized. This may result in a phase difference between the noise occurrence cycle and the driving cycle of the driving signal. However, the touch sensing device according to an embodiment can minimize the influence of display noise in spite of such a phase difference.

Figure 7:
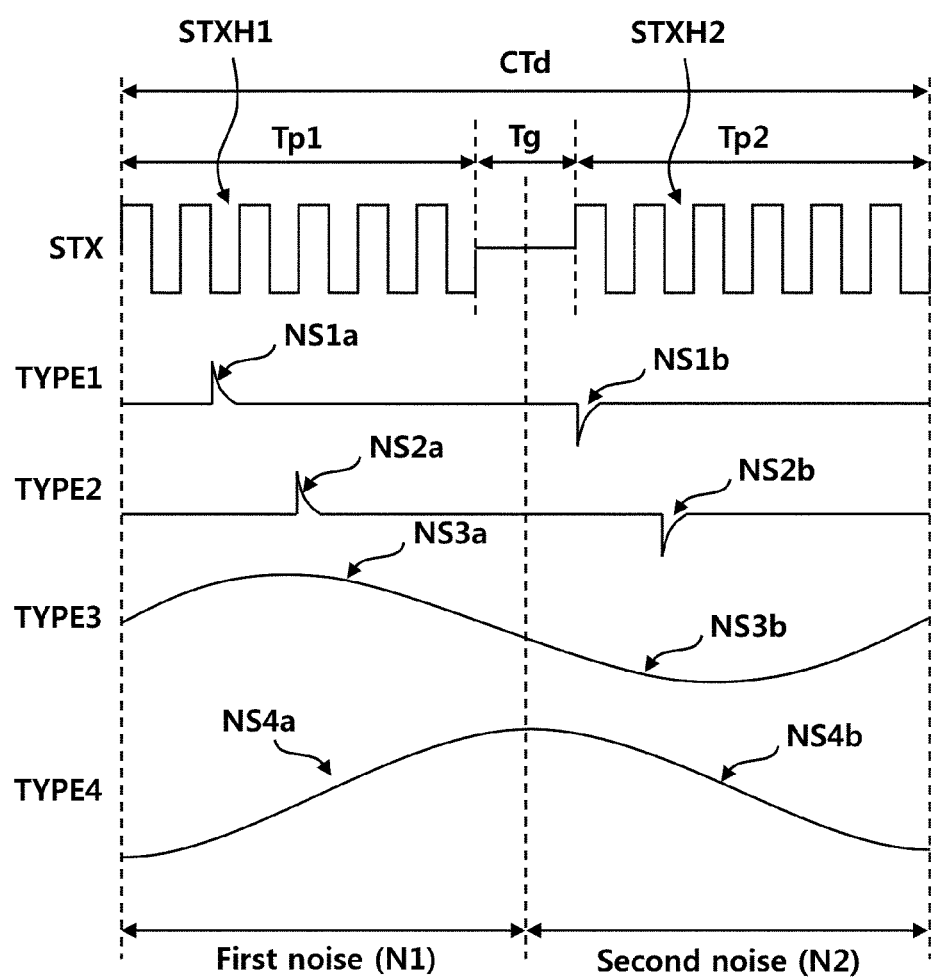
FIG. 7 is a diagram illustrating first exemplary waveforms of a driving signal and noise according to an embodiment.

FIG. 7 is a diagram illustrating first exemplary waveforms of a driving signal and noise according to an embodiment.

Referring to FIG. 7, the first part driving signal STXH1 supplied for the first part time Tp1 and the second part driving signal STXH2 supplied for the second part time Tp2 may have the same waveform. Substantially, the first part driving signal STXH1 and the second part driving signal STXH2 may have the same phase and the same driving time.

The noise may include noise with opposite waveforms for the first part time Tp1 and the second part time Tp2. Alternatively, the noise may include noise with opposite waveforms for the first half cycle and the second half cycle.

For example, the first type of noise and the second type of noise include on-off noise NS1a and NS2a with a (+) polarity for the first part time Tp1, and include on-off noise NS1b and NS2b with a (−) polarity for the second part time Tp2. As another example, the third type of noise and the fourth type of noise include noise NS3a and NS4a for the first part time Tp1 and noise NS3b and NS4b for the second part time Tp2, which have opposite waveforms (waveforms with opposite polarities).

Noise with opposite waveforms influences the first part driving signal STXH1 and the second part driving signal STXH2 or the first part reaction signal and the second part reaction signal. The touch sensing device may conduct an operation (for example, summating or averaging) with regard to the first part sensing data and the second part sensing data corresponding to the first part reaction signal and the second part reaction signal, thereby removing noise.

The first part time Tp1 and the second part time Tp2 may have the same length. The driving unit of the touch sensing device may supply the same part driving signal for different part times, excluding the gap time Tg, thereby completing a driving signal STX.

Figure 8:
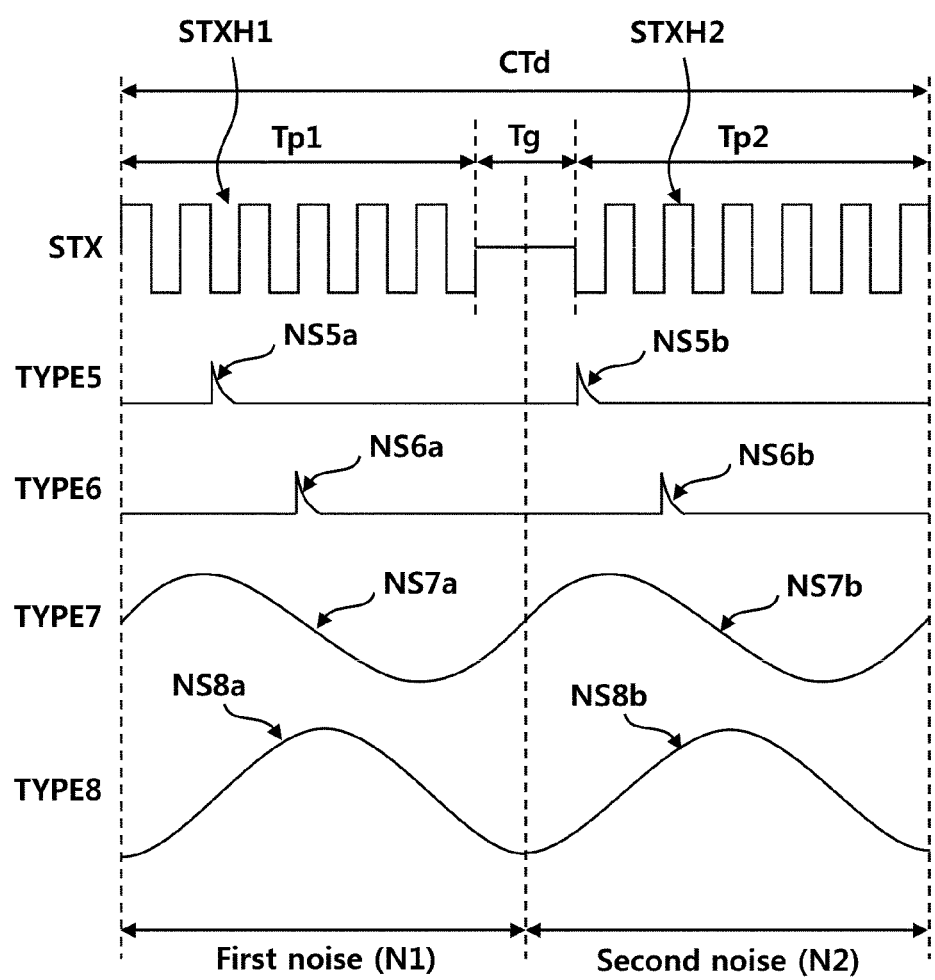
FIG. 8 is a diagram illustrating second exemplary waveforms of a driving signal and noise according to an embodiment.

FIG. 8 is a diagram illustrating second exemplary waveforms of a driving signal and noise according to an embodiment.

Referring to FIG. 8, the first part driving signal SUCH' supplied for the first part time Tp1 and the second part driving signal STXH2 supplied for the second part time Tp2 may have opposite waveforms. Substantially, the first part driving signal STXH1 and the second part driving signal STXH2 may have a phase difference of 180° between them and may have the same driving time.

The noise may include noise with the same waveform for the first part time Tp1 and the second part time Tp2. Alternatively, the noise may include noise with the same waveform for the first half cycle and the second half cycle.

For example, the fifth type of noise and the sixth type of noise may include on-off noise NS5a and NS6a for the first part time Tp1 and on-off noise NS5b and NS6b for the second part time Tp2, which may have the same waveform. As another example, the seventh type of noise and the eighth type of noise may include noise NS7a and NS8a for the first part time Tp1 and noise NS7b and NS8b for the second part time Tp2, which may have the same waveform (waveforms having the same phase).

Noise with the same waveform influences the first part driving signal STXH1 and the second part driving signal STXH2 or the first part reaction signal and the second part reaction signal. The touch sensing device may conduct an operation with regard to the first part sensing data and the second part sensing data corresponding to the first part reaction signal and the second part reaction signal, thereby removing noise. According to the scheme of demodulating the first part reaction signal and the second part reaction signal, the touch sensing device may summate the first part sensing data and the second part sensing data or subtract the first part sensing data and the second part sensing data. When the first part sensing data and the second part sensing data have values with the same polarity as a result of demodulation, the touch sensing device may summate the first part sensing data and the second part sensing data. When the first part sensing data and the second part sensing data have values with opposite polarities, the touch sensing device may subtract the first part sensing data and the second part sensing data.

Figure 9:
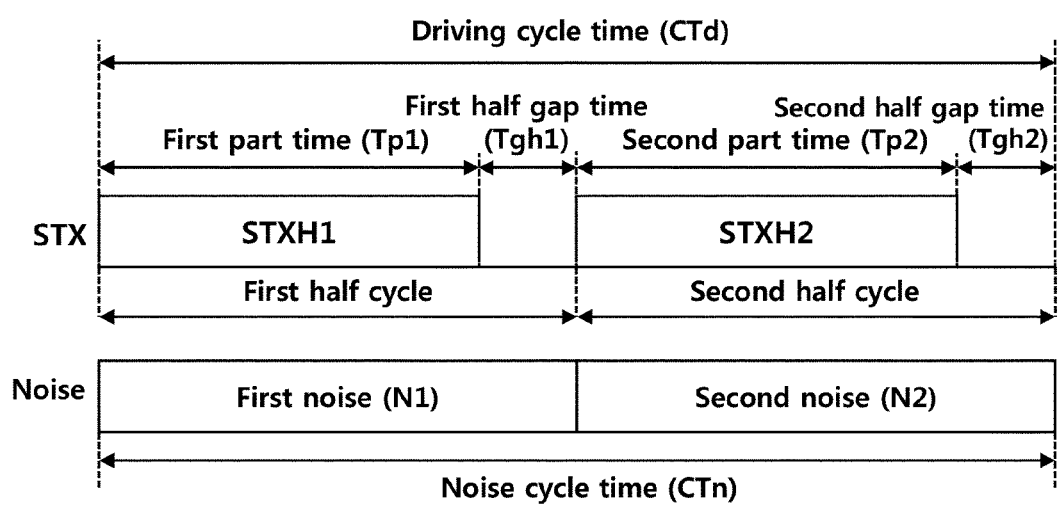
FIG. 9 is a diagram illustrating a second exemplary configuration of a driving signal in a touch sensing device according to an embodiment.

FIG. 9 is a diagram illustrating a second exemplary configuration of a driving signal in a touch sensing device according to an embodiment.

Referring to FIG. 9, the driving cycle time CTd of the driving signal may include a first part time Tp1, a gap time Tg, and a second part time Tp2. The gap time Tg may be divided into a first half gap time Tg1 and a second half gap time Tgh2. The first half gap time Tgh1 may be arranged after the first part time Tp1, and the second half gap time Tgh2 may be arranged after the second part time Tp2.

The touch sensing device may adjust the gap time Tg such that the driving cycle time CTd coincides with the noise cycle time CTn. The touch sensing device may adjust and control the first half gap time Tgh1 such that the sum of the first part time Tp1 and the first half gap time Tgh1 corresponds to the first half cycle. In addition, the touch sensing device may adjust and control the second half gap time Tgh2 such that the sum of the second part time Tp2 and the second half gap time Tgh2 corresponds to the second half cycle.

The waveforms of the noise cycle, the first half cycle, and the second half cycle may be measured prior to driving the touch sensing device. The touch sensing device may adjust the gap time Tg in view of the noise cycle time CTn and the driving times Tp1 and Tp2 of the part driving signals.

$$Tp1+Tp2+Tg=CTn \quad \text{[Equation 1]}$$

The touch sensing device may adjust the gap time Tg such that the sum of the first part time Tp1, the second part time Tp2, and the gap time Tg coincides with the noise cycle time CTn.

$$Tp1+Tgh1=CTn/2, Tp2+Tgh2=CTn/2 \quad \text{[Equation 2]}$$

The touch sensing device may adjust the first half gap time Tgh1 such that the sum of the first part time Tp1 and the first half gap time Tgh1 corresponds to half the noise cycle time CTn, and may adjust the second half gap time Tgh2 such that the sum of the second part time Tp2 and the second half gap time Tgh2 corresponds to half the noise cycle time CTn.

Meanwhile, the above-mentioned noise cycle time CTn does not mean the minimum cycle. In other words, there may be a cycle time shorter than the above-mentioned noise cycle time CTn. For example, if first noise N1 for the first half cycle and second noise N2 for the second half cycle have the same phase, waveform, and time, the minimum cycle may be ½, ¼, ⅙, . . . or the like of the noise cycle time CTn.

Assuming that the minimum cycle of noise is Tn, the first part time Tp1 and the second part time Tp2 are identical, and the sum of the first part time Tp1 and the second part time Tp2 is Td, then the gap time Tg may be determined as follows:

$$(0.5)Td+Tg=(N+0.5)Tn, fn=(N+0.5)/(0.5Td+Tg) \quad \text{[Equation 3]}$$

wherein N may be 0 or a natural number. If the gap time Tg is determined as in Equation 3, noise for the first half cycle and noise for the second half cycle may have opposite waveforms.

$$(0.5)Td+Tg=(M)Tn, fn=M/(0.5Td+Tg) \quad \text{[Equation 4]}$$

wherein M may be a natural number. If the gap time Tg is determined as in Equation 4, noise for the first half cycle and noise for the second half cycle may the same waveform.

The touch sensing device may have such a gap time stored as a configuration value and may vary the value according to the characteristics of the display device.

Figure 10:
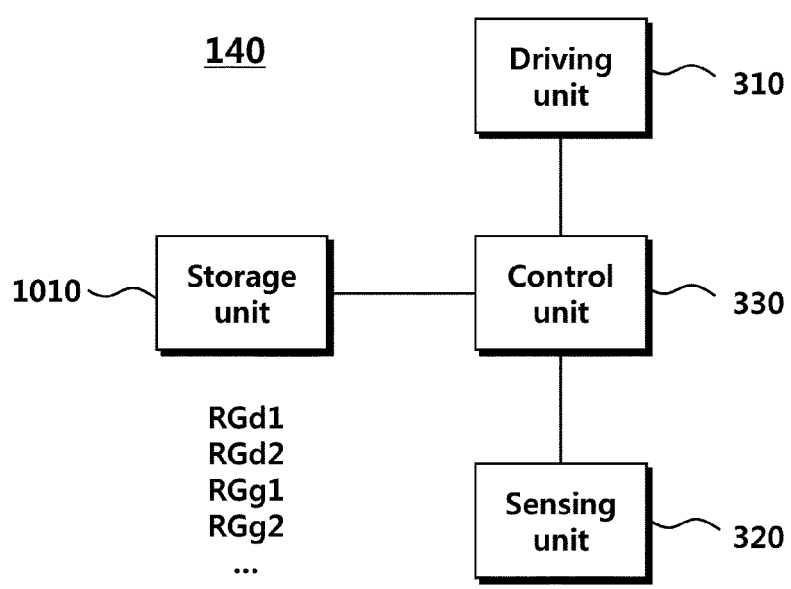
FIG. 10 is a diagram illustrating the configuration of a touch sensing device further including a storage unit.

FIG. 10 is a diagram illustrating the configuration of a touch sensing device further including a storage unit.

Referring to FIG. 10, the touch sensing device 140 may include a driving unit 310, a control unit 330, and a sensing unit 320, and may further include a storage unit 1010.

The storage unit 1010 may include at least one register RGd1, RGd2, RCg1, RGg2, . . . . The user may measure a specific value through an experiment or the like, and may store a configuration value corresponding thereto in the at least one register RGd1, RGd2, RGg1, RCg2, . . . .

For example, the length of the gap time may be stored in gap time registers RCg1 and RGg2 included in the storage unit 1010. The gap time may be divided into a first half gap time and a second half gap time, which may be stored in the first gap time register RCg1 and the second gap time register RGg2, respectively, or may be stored in a single register. The control unit may adjust the length of the gap time according to values stored in the gap time registers.

The phase or phase difference of the first part driving signal and the second part driving signal may be stored in phase registers RGd1 and RGd2 included in the storage unit 1010. The control unit may determine the phase difference between the first part driving signal and the second part driving signal (whether or not the phases are identical or have a difference of 180°) according to the values stored in the phase registers RGd1 and RGd2.

Meanwhile, the gap time may be controlled by an external sync signal.

For example, the starting time of the first part driving signal and that of the second part driving signal may be controlled (synchronized) by the external sync signal. In such an example, if the first part driving signal and the second part driving signal have fixed lengths, the length of the gap time may be determined automatically by the time interval between the first part driving signal and the second part driving signal. Specifically, the gap time may be positioned between the ending time of the first part driving signal and the starting time of the second part driving signal, or the gap time may be positioned between the ending time of the second part driving signal and the starting time of the first part driving signal. The external sync signal may be generated according to the rising edge or falling edge of noise.

What is claimed is:

1. A touch sensing device configured to drive a touch panel influenced by periodic noise in a display time where a display panel is driven and to generate sensing data in every period, the touch sensing device comprising:
 a driving unit configured to supply a first part driving signal, comprising a plurality of driving pulses, to a driving electrode of the touch panel during a first part time in a period and to supply a second part driving signal, comprising the plurality of driving pulses, to the driving electrode of the touch panel during a second part time apart from the first part time by a gap time in the period, wherein the driving unit simultaneously supplies multiple part driving signals to multiple driving electrodes;
 a sensing unit configured to receive a first part reaction signal to the first part driving signal from a sensing electrode of the touch panel, to generate first part sensing data using the first part reaction signal, to receive a second part reaction signal to the second part driving signal from the sensing electrode, to generate second part sensing data using the second part reaction signal, and to generate the sensing data for the touch panel by processing the first part sensing data and the second part sensing data; and
 a control unit configured to control the driving unit and the sensing unit and to adjust a length of the gap time to match a driving cycle of a driving signal and a noise occurrence cycle.

2. The touch sensing device of claim 1, wherein the control unit is configured to control the driving unit such that the first part driving signal and the second part driving signal have substantially a same waveform when a first half cycle and a second half cycle of the periodic noise respectively have opposite waveforms.

3. The touch sensing device of claim 1, wherein the control unit is configured to control the driving unit such that the first part driving signal and the second part driving signal have a phase difference of 180° between them when a first half cycle and a second half cycle of the periodic noise have substantially a same waveform.

4. The touch sensing device of claim 1, wherein the first part time and the second part time have substantially a same length.

5. The touch sensing device of claim 1, wherein the driving unit is capable of simultaneously driving multiple driving electrodes by using a phase modulation scheme.

6. The touch sensing device of claim 1, wherein the periodic noise and the driving signal have a phase difference between them.

7. The touch sensing device of claim 1, wherein the driving unit is configured to supply no driving signal for the gap time, and the control unit is configured to adjust a length of the gap time such that a driving cycle substantially coincides with the periodic noise occurrence cycle.

8. The touch sensing device of claim 7, further comprising a storage unit having a gap time register configured to store the length of the gap time, wherein the control unit is configured to adjust the length of the gap time according to a value stored in the gap time register.

9. The touch sensing device of claim 8, wherein the storage unit further comprises a phase register configured to store the phase difference between the first part driving signal and the second part driving signal, and the control unit is configured to determine the phase difference between the first part driving signal and the second part driving signal according to a value stored in the phase register.

10. A touch sensing system comprising:
- a touch panel on which multiple driving electrodes are disposed and multiple sensing electrodes, respectively coupled to the driving electrodes by a capacitance, are disposed and adjacent to which a display panel is disposed; and
- a touch driving device configured to drive a touch panel influenced by periodic noise in a display time where a display panel is driven, to generate sensing data in every period, to supply a first part driving signal, comprising a plurality of driving pulses, to the driving electrodes during a first part time in a period, to supply a second part driving signal, comprising the plurality of driving pulses, to the driving electrodes during a second part time apart from the first part time by a gap time in the period, to receive a first part reaction signal to the first part driving signal from the sensing electrodes, to generate first part sensing data using the first part reaction signal, to receive a second part reaction signal to the second part driving signal from the sensing electrodes, to generate second part sensing data using the second part reaction signal, to generate the sensing data for the touch panel by processing the first part sensing data and the second part sensing data, and to adjust a length of the gap time to match a driving cycle of a driving signal and a noise occurrence cycle,
- wherein the touch driving device simultaneously supplies multiple part driving signals to multiple driving electrodes.

11. The touch sensing system of claim 10, wherein a driving cycle of the display panel and a driving cycle of the touch panel are unsynchronized.

12. The touch sensing system of claim 10, wherein some electrodes disposed on the display panel and the driving electrodes or the sensing electrodes are coupled by a capacitance.

13. The touch sensing system of claim 10, wherein the touch driving device is configured to adjust a length of a gap time during which no driving signal is supplied such that the driving cycle of the touch panel substantially coincides with a noise occurrence cycle of the display panel.

14. The touch sensing system of claim 13, wherein the first part time and the second part time are fixed, and the gap time is variable.

15. The touch sensing system of claim 10, wherein the touch driving device is configured to control the first part driving signal and the second part driving signal so as to have a phase difference of 180° between them when a first half cycle and a second half cycle of noise from the display panel respectively have opposite waveforms.

16. The touch sensing system of claim 10, wherein the touch driving device is configured to control the first part driving signal and the second part driving signal so as to have substantially the same waveform when a first half cycle and a second half cycle of noise from the display panel respectively have substantially a same waveform.

17. A method for driving a touch panel influenced by periodic noise in a display time where a display panel is driven and for generating sensing data in every period, the method comprising:
- supplying simultaneously multiple part driving signals to multiple driving electrodes;
- supplying a first part driving signal, comprising a plurality of driving pulses, to a driving electrode of the touch panel during a first part time in a period, receiving a first part reaction signal to the first part driving signal from a sensing electrode of the touch panel, and generating first part sensing data using the first part reaction signal;
- supplying a second part driving signal, comprising the plurality of driving pulses, to the driving electrode of the touch panel during a second part time apart from the first part time by a gap time in the period, receiving a second part reaction signal to the second part driving signal from the sensing electrode, and generating second part sensing data using the second part reaction signal; generating the sensing data regarding the touch panel by processing the first part sensing data and the second part sensing data; and adjusting a length of the gap time to match a driving cycle of a driving signal and a noise occurrence cycle.

18. The method of claim 17, further comprising adjusting a gap time during which no driving signal is supplied such that a driving cycle regarding the touch panel substantially coincides with the periodic noise occurrence cycle.

19. The method of claim 18, wherein the gap time is divided into a first half gap time and a second half gap time, the first half gap time is arranged after the first part time, and the second half gap time is arranged after the second part time.

* * * * *